United States Patent
Langley

(10) Patent No.: US 8,201,862 B2
(45) Date of Patent: Jun. 19, 2012

(54) DEVICE FOR COLLECTING AND CONTAINING SOLID OR LIQUID SUBSTANCES, INCLUDING ANIMAL OR HUMAN WASTE

(75) Inventor: John Charles Mark Langley, Edinburgh (GB)

(73) Assignee: Venture One (IP) Limited, Glascow (GB)

( * ) Notice: Subject to any disclaimer, the term of this patent is extended or adjusted under 35 U.S.C. 154(b) by 0 days.

(21) Appl. No.: 12/665,016

(22) PCT Filed: Jun. 20, 2008

(86) PCT No.: PCT/GB2008/002121
§ 371 (c)(1),
(2), (4) Date: Mar. 3, 2010

(87) PCT Pub. No.: WO2008/155557
PCT Pub. Date: Dec. 24, 2008

(65) Prior Publication Data
US 2010/0194128 A1    Aug. 5, 2010

(30) Foreign Application Priority Data
Jun. 21, 2007 (GB) .................................. 0712029.8

(51) Int. Cl.
*A01K 29/00* (2006.01)
*E01H 1/12* (2006.01)
(52) U.S. Cl. ........................................... 294/1.3
(58) Field of Classification Search .................. 294/1.3, 294/1.4, 1.5, 55; 15/257.1, 257.3, 257.4, 15/257.7, 257.9, 104.8; 248/95, 99; 206/223; D30/162
See application file for complete search history.

(56) References Cited

U.S. PATENT DOCUMENTS

| 1,521,768 | A | | 1/1925 | Herrmann |
| 3,872,834 | A | * | 3/1975 | Fuhrman ........................ 294/1.4 |
| 4,221,415 | A | * | 9/1980 | Ganz .............................. 294/1.4 |
| 4,458,932 | A | * | 7/1984 | Resch ............................. 294/1.3 |
| 5,419,049 | A | * | 5/1995 | MacArthur-Onslow ........ 30/322 |
| D417,042 | S | * | 11/1999 | Hodges et al. ............... D30/162 |
| 6,086,123 | A | * | 7/2000 | Sowinski et al. ............. 294/1.3 |
| 6,126,215 | A | * | 10/2000 | Jahns ............................. 294/1.3 |
| 7,637,417 | B2 | * | 12/2009 | Fite et al. ..................... 229/186 |
| 2008/0048463 | A1 | * | 2/2008 | Selenke et al. ................ 294/1.3 |

FOREIGN PATENT DOCUMENTS
WO    WO 2005/000016    1/2005

OTHER PUBLICATIONS

The International Search Report and Written Opinion from corresponding Int'l Application No. PCT/GB08/002121 dated Jan. 15, 2009.

* cited by examiner

*Primary Examiner* — Paul T Chin
(74) *Attorney, Agent, or Firm* — Snell & Wilmer L.L.P.

(57) ABSTRACT

A collector device (1) includes an elongate handle portion (2) having a loop portion (4) attached at one end. The loop portion (4) supports a receptacle (12) which comprises an upwardly facing, in use, deposition surface (16). The handle (2) and loop portions (4) are of a self supporting sheet material and have a longitudinal fold in the sheet material (8) running along the length of the handle portion (2) and continuing across the whole loop portion (4). The device (1) may be deployed with the handle (2) and loop portions (4) both held partially folded along the longitudinal fold (8) in a V or inverted V conformation to provide increased rigidity and increased load bearing capacity, in cantilever, in comparison with a device where the handle and loop portions are held horizontally planar.

28 Claims, 7 Drawing Sheets

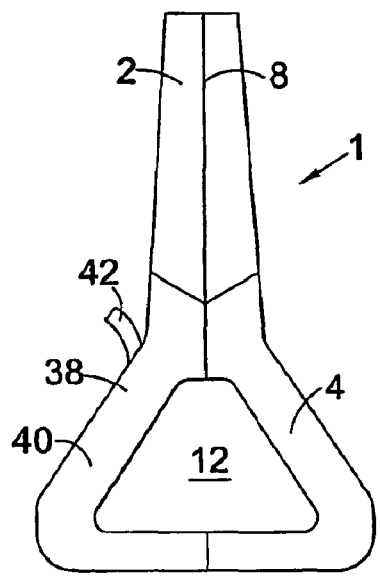
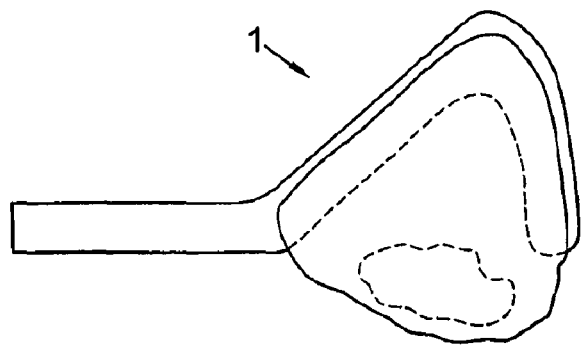
Fig.4a  Fig.4b
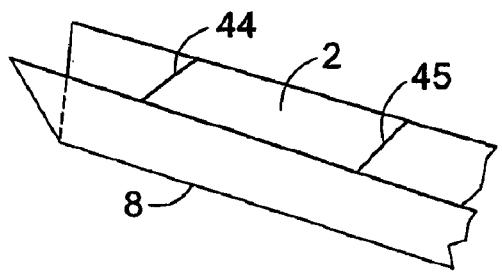
Fig.5
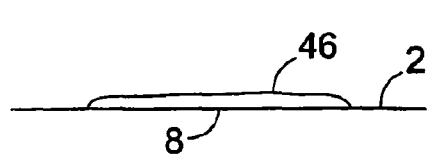 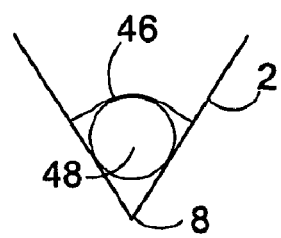
Fig.6a  Fig.6b

DEVICE FOR COLLECTING AND CONTAINING SOLID OR LIQUID SUBSTANCES, INCLUDING ANIMAL OR HUMAN WASTE

CROSS-REFERENCE TO RELATED APPLICATIONS

This application is U.S. national phase filing under 35 U.S.C. §371 of PCT/GB2008/002121 filed Jun. 20, 2008 and claims priority from United Kingdom Application No. GB 0712029.8 which was filed on Jun. 21, 2007, and are both incorporated herein by reference.

The present invention relates to articles comprising self-supporting sheet material that can serve for a variety of uses including a collector device for catching and containing animal faeces or urine or other solid or liquid substances. Other articles of the invention can be used as display devices for displaying written graphical or pictorial information, childrens toys or hats.

Devices for the receiving and disposal of animal, particularly dog faeces have been proposed previously. Most have proved to be unsatisfactory for a number of reasons including bulkiness; complexity of use; risk of faecal matter contamination; expense or simply lack of practicality.

In a previous application (WO 96/07317, Langley) we disclosed particularly lightweight, collapsible, highly pocketable forms of dog faeces collector. These have an elongate handle and receptacle support supporting a receptacle for receiving a faecal deposit. The handle and receptacle support have very limited rigidity, just sufficient to be self supporting when deployed for use, allowing an operator holding the handle to position and direct the empty receptacle correctly relative to the animal's anus. Once a faecal deposit is made in the receptacle, the handle and receptacle support have insufficient load bearing capacity (rigidity) to bear in cantilevered support the turning moment caused by the faecally loaded receptacle. However the loaded receptacle can hang down suspended from the handle held by the operator, relying on the tensile strength of the materials of construction of the device, whilst being carried to a disposal site.

Whilst such a device is satisfactory in many circumstances the lack of rigidity and inability to carry a loaded receptacle in cantilevered support, (forwards of the handle) can present some disadvantages. In windy conditions the low rigidity makes the positioning of the empty receptacle more difficult as the handle may bend or even collapse under high wind pressure. Furthermore some dogs tend to walk during defecation making it desirable to be able to move the receptacle of a collector into a new position even when the receptacle is loaded. In addition if the collector device is being employed to collect a liquid e.g. urine, it may be desirable, in order to avoid spillage, to hold the urine loaded receptacle in cantilevered support, forwards of the handle.

It is an object of the present invention to provide improved collector devices that present certain advantages in use over known devices and are relatively economic in manufacture.

The present invention provides a collector device suitable, but not exclusively, for use in collecting animal waste such as faeces or urine comprising:
an elongate handle portion having at one end a loop portion attached thereto, said loop portion, supporting a receptacle which comprises an upwardly facing, in use, deposition surface; wherein said handle and loop portions are of a self supporting sheet material, having a longitudinal fold running along the length of the handle portion and continuing across the loop portion; whereby, in use, the device, may be deployed with said handle and loop portions held partially folded along said longitudinal fold to provide increased rigidity and increased load bearing capacity, in cantilever, in comparison with a device where the handle and loop portions are held planar.

Preferably the longitudinal fold runs along the centre of the elongate handle portion The longitudinal fold affords increased rigidity and greatly increased load bearing capacity (in cantilever) in comparison to a device that has a planar sheet handle portion and loop portion. With a planar sheet the load bearing capacity, in cantilever, depends on the bending or breaking strength of a given thickness of the material from which the sheet is made. Viewed in cross section, looking down the longitudinal fold, a device partially folded along the longitudinal fold has a V or inverted V (Λ) conformation. The hand of a user, or other means, as described hereafter, is used to maintain the desired angle of fold. A sheet material partially folded in this way has substantially greater load bearing capacity, in cantilever, than an unfolded sheet. The strength of the folded handle and loop portion depends on the bending or breaking (shearing) strength of the width rather than of the thickness of the sheet material employed, giving considerable additional load bearing capacity to a device folded in the V conformation. The angle of the V conformation may be obtuse or acute, an acute angle generally provides greater load bearing capacity. In general the degree of angle employed is chosen depending on the particular load to be carried in relation to the strength of the sheet material employed to make the device.

The provision of the fold allows the handle and loop portions of a device of the invention to be constructed of particularly lightweight sheet material even, for example, of a thin card which is just capable, when held planar, of providing sufficient rigidity so that the device is self-supporting when empty, but which collapses when under even a small load. When held partially folded a substantial increase in load bearing capacity is achieved.

Devices of the invention are particularly useful in windy conditions when correct deployment of a lightweight device is difficult due to the deformation of the structure caused by wind pressure. The increased load bearing capacity also allows an owner to follow a walking dog until the receptacle is correctly relocated under the animal even when partially loaded with faecal deposits. Furthermore collection of liquids without spillage, is made easier as the loaded receptacle can be held in cantilevered support from the handle.

Preferably the handle portion and the loop portion attached to it are of one piece in construction i.e. the handle and the loop portions are continuous, formed from a single piece of sheet material. This has the benefit that the devices of the invention may be made relatively simply and particularly economically in comparison with more complex or robust structures. The combined (one piece) handle and loop portions may be made in one operation by cutting or stamping out from a sheet of a suitable material. The longitudinal fold is made by, for example, folding, scoring, or embossing the sheet, to form a crease in a manner well known to those skilled in the art. The receptacle is then attached to the loop portion. Alternatively, if desired, the handle and loop portions, may each be of a separate portion of sheet material, joined together, for example by adhesive tape. As a further alternative the handle and loop portions may comprise two halves, joined together along the longitudinal fold. Different sheet material may be used for the handle portion and the loop portion. However these alternatives may have the disadvantage of increasing the cost and complexity of manufacture when compared with a device having a one piece cut or stamped out combined handle and receptacle loop.

The sheet material may be of any type having at least the limited, self supporting, rigidity sufficient to hold the partially folded shape in use. For example card, corrugated card, plastics, corrugated plastics, wax coated or plastic coated card or cardboard are preferred materials. Recycled and recyclable materials can be used for most applications of the devices. The preferred materials are relatively inexpensive and suitable for the lightweight and usually disposable devices desired for most uses of the invention. Biodegradable materials are particularly preferred, for example biodegradable cellulose or plastics materials. Thin sheets of the preferred materials, less than 2 mm thick, often less that 1 mm thick can have sufficient load bearing capacity for many applications. The weight of a device of the invention may be reduced even further by providing a handle portion and/or loop portion that is/are made of a sheet material that has holes distributed across the sheet to reduce its weight and the total quantity of material used in its manufacture. In some applications a stronger or more durable sheet material may be desirable or required. In such cases the handle portion and loop portion may be made of a strong plastics material or even a metal sheeting. If the metal sheeting or strong plastic sheet is not readily folded then the folds required in the device may take the form of appropriately hinged joints.

Preferably the receptacle takes the form of a bag sized and shaped for the chosen application. The receptacle may be of a paper-based material for many applications, which is relatively inexpensive and generally biodegradable. Preferably the bag is of a water resistant flexible material such as for example polyethylene or a biodegradable plastic.

Preferably the receptacle is attached continuously all around the loop portion. More preferably the receptacle is sealingly attached all around the loop portion. This prevents the loss of collected material, especially when it is a liquid such as urine. The attachment can be achieved by any means. For example by glueing with a suitable adhesive, thermal bonding, taping, stapling or stitching. In some cases, where the handle and loop portion are reusable, receptacles may be supplied as replaceable, disposable items which clip onto the loop portion.

Stitching the receptacle to the loop portion with a thread running round the loop portion has the additional benefit that the tensile strength of the thread can provide some resistance to tearing of the loop portion, which can be useful when the loop portion is of a particularly thin, relatively low tear strength material. In some cases, even where the receptacle is not stitched to the loop, at least one thread or wire may be stitched around the loop portion to provide tear resistance.

Conveniently the receptacle is a flexible bag of a liquid resistant material and the rim of the bag overlays the upper (in use) surface of the loop portion. This protects the loop portion material from liquid damage in use. Relatively inexpensive materials, such as uncoated card, can then be used for most applications, even where a liquid is being collected. For example, in the case of a urine-sampling device, once a sample has been collected in the receptacle, the urine may be poured into another container for analysis, without contamination of the sample caused by contact with the card material. Conveniently, the folded end of the loop portion, most distal from the handle portion, acts as a pouring spout in liquid handling operations.

Advantageously, the receptacle (bag) may be formed by first bonding a sheet of a liquid resistant plastics material onto the upper (in use) surface of the loop portion and then creating the desired receptacle shape by carrying out a vacuum forming process on the portion of the sheet of plastic lying across the inside of the loop portion. This provides a convenient manufacturing method for the receptacle and also results in the loop portion being coated with a layer of water resistant material. If desired the sheet of liquid resistant material can also cover, and be bonded to, the handle portion of the device.

The collector device of the invention may be held in the partially folded (along the longitudinal fold) position, by hand, as described above. Alternatively a strap or tie may be provided to secure the deployed device with the desired 'V' cross section. The strap or tie is fixed transversely across the handle and/or loop portion from one arm of the 'V' to the other, preventing unfolding about the longitudinal fold, past a chosen angle of the 'V' cross section.

Other means of holding or securing this V cross section may be employed. For example, the device may further comprise a sleeve portion or a loop or loops, disposed transversely along the handle portion, into which an elongate rigid member such as a pencil or pen type torch may be inserted, along the line of the longitudinal fold, to maintain the desired 'V' cross section in use. For example the sleeve portion may be a piece of flexible polyethylene sheeting which is attached at each edge of the handle portion and runs across the top surface of the sheet material that makes up the handle portion. The addition of an article such as a pen torch to the device also has the effect of increasing the weight of the device, making it more stable in windy conditions when placed for use on the ground (and not held by the handle). The use of a torch also provides convenient illumination at night.

The devices of the invention may be folded, into a more compact form, prior to deployment for use. For example, simply folding together the two sides of the handle and loop portions along the longitudinal fold reduces the width of a device.

It will be understood that, if desired, each fold or a part of a fold (in a device of the invention) may be established, in manufacture, on the sheet material, in such a way as to enable the sheet to be folded more easily in one direction than the other, about the fold. This makes it easier to fold and deploy the devices of the invention in the desired manner. For example, in the manufacture of a device of the invention, a sheet of thin card may be folded over once, to crease and establish a fold in the material. In use the sheet will be most easily folded along the same line, by folding in the same direction rather than back against the original direction of folding. In addition many sheet materials will be, at least to some extent, resilient when folded about such a 'one way' fold. The sheet material will tend to open from the folded position, assisting in the deployment (unfolding) of a device of the invention.

Preferably the device further comprises a first transverse fold, across the width of the device at or near the junction between the handle portion and the loop portion. This allows the device to be folded, not only about the longitudinal fold, but also about the transverse fold to provide a more compact, folded device before deployment for use. Folding about the transverse fold allows the handle portion to be folded onto the receptacle loop portion.

Desirably the first transverse fold compromises two fold portions each running diagonally across the sheet from opposed edges of the handle portion in a direction towards the loop portion and meeting to form an angle, with its apex on the longitudinal fold. The 'angle fold' thus has its apex pointing towards the receptacle loop portion. This arrangement has been found beneficial in folding and unfolding (for deployment) a device of the invention as described hereafter with reference to specific embodiments. A further advantage of a device with this folding arrangement is that the receptacle (where made as a flexible bag) and the loop portion may be positioned and then laid flat on the ground for use. This allows the empty receptacle to be easily and accurately positioned below even a very small dog.

Advantageously a small perforation is provided through the sheet material at or near the apex of the angle fold. This perforation has been found to improve the smooth folding action of devices of the invention and reduces the likelihood of tearing at the apex of the angle fold during folding and unfolding operations. Typically the perforation is a hole of about 3-8 mm diameter.

Advantageously the device of the invention may be provided with further folds. Devices of the invention may be folded in a number of ways depending on requirements, for example, to allow folding or packaging into a particularly compact form, suitable for pocketing.

Preferably the device is provided with a second transverse fold, running across the width of the loop portion at right angles to the longitudinal fold. More preferably the second transverse fold is at right angles to the longitudinal fold and divides the loop portion approximately in half. This allows folding of a device of the invention in a particularly effective and compact fashion. For example and as described in more detail hereafter with reference to specific embodiments, a device of the invention having these folds may be folded in a 'Z' arrangement, with the handle portion folded at the first transverse fold in the opposite direction to the folding of the second transverse fold on the receptacle loop portion. When folding is completed, including along the longitudinal fold, the folded handle portion nests conveniently inside the folded loop portion. Unfolding a device folded in this fashion is simple and rapid. The unfolding action can be enhanced by providing folds that are at least to some extent resiliently biased towards the open condition, by suitable selection of the sheet material and method of manufacture of the fold.

In a particularly preferred form of a device of the invention the handle portion has a length corresponding to approximately half of the diameter of the loop portion, as measured at the longitudinal fold. When folded in the Z fashion described above the folded device then has a length substantially equal to that of the handle portion.

Desirably the handle portion may be provided with a handle extension portion, distal from the loop portion. The handle extension portion includes a continuation of the longitudinal fold of the handle portion and connects, at a third transverse fold, to the end of the handle portion. Where a device with a particularly long handle portion is desired, more than one handle extension portion may be fitted, with each connected to the next by a transverse fold. Advantageously the extension portion is about the same length as the handle portion. The third transverse fold may take the same 'angle fold' form as that described previously for the first transverse fold and may also include a perforation at the apex of the fold. The handle extension portion may be folded at the third transverse fold onto the handle portion when the device is folded into a compact form prior to deployment for use.

A handle extension portion may be formed so as to be detachable from the handle portion of the device. For example, the third transverse fold may comprise multiple perforations along the fold line, to allow the extension portion to be easily torn off. The torn off extension portion may then be used as an implement to assist in collecting material that may not have been collected successfully in the receptacle.

The loop portion may be of any desired size and shape, suitable for the intended use. For example the loop portion may be circular, triangular or substantially quadrilateral in form. Preferably the loop portion has the form of a rhombus or a square with an apex adjacent the handle portion. Such a shape provides good load bearing support for the receptacle when deployed partially folded along the longitudinal fold.

Advantageously the collector device is provided with a releasable closure means when in a folded state before deployment. This may be for example a tie or a piece of adhesive tape that is removed when the device is to be deployed. Alternatively or additionally the folded device may be supplied in a bag or other container.

Advantageously the collector device is provided with a receptacle closure means for closing a loaded receptacle following use. This allows the loaded device to be carried until disposal, with the load secured from spillage. Preferably the receptacle closure means comprises an adhesive strip, hook and loop type fastener or other securing or sealing means located at one or more points on the upper, in use, surface of the loop portion. The loaded collector device can then be folded, along the longitudinal fold or, where it is present, the second transverse fold. The adhesive tape strip or other sealing means then holds the opposed sides of the folded loop portion together, thereby closing the receptacle. More preferably the receptacle closure means comprises an adhesive surface running around at least one half of the loop portion. On folding the loop portion, in half, the adhesive surface forms a continuous seal, closing the receptacle and securing its contents. Where an adhesive tape or other adhesive surface is provided it may conveniently be protected by a strip of a release paper prior to use.

The collector devices of the invention can find a number of different uses, in addition to animal faeces or urine collection. They provide a convenient, low cost light weight optionally disposable article that can be supplied in a compact folded, often pocketable form. In addition to the collection of animal faeces or urine, suitably sized devices can be used by humans. For example, when camping in environmentally sensitive areas where all waste products must be removed from the area. When employed for such use with human waste products the device may advantageously be supplied in a sealable or resealable bag together with tissue paper, germicidal wipes and deodorant if desired. After use the receptacle is sealed and the device then placed in the bag, which is in turn sealed to provide extra security from leakage during transport.

Other uses of the devices include collection of any solid or liquid for disposal, for example used oil from a motor vehicle engine, food waste or vomit. The collector devices can be conveniently employed as a dustpan, material spilt on the ground can be swept into the receptacle with a brush, whilst part of the loop portion is held in contact with the ground. Devices of the invention may also be made with a receptacle that is perforated or is in the form of a mesh. Such devices can be used as (optionally disposable) nets or colanders. For example, a foldable landing net for sport fishing, which can be made with metal or plastics sheet handle and loop portions.

A further application of the device is as a container for hot food. For example, hot food can be placed in the receptacle and carried comfortably by the handle portion whilst the food is being consumed. After use the receptacle may be closed by a receptacle closure means or simply by folding the handle and loop portions, allowing hygienic disposal of the device and any waste food remaining in the receptacle. As with other uses of the device of the invention the desired 'V' cross section, in use, may be maintained by holding with the hand. Advantageously, for safety reasons, a strap, tie or other means can be provided to secure the deployed device with the desired 'V' cross section when in use with hot foods. This ensures that the increased load bearing capacity provided by the V folding is maintained, avoiding accident.

Devices of the invention may also provide containers for foodstuffs, powders and a wide range of other products or as a container for waste. For example, a device with a receptacle in the form of a bag with a flat base for sitting on a surface can be used to hold foodstuffs such as sugar. The container is supplied filled with the product, and sealed closed. The user opens the container, unfolding the handle and loop portions, allowing access to the contents. The opened container sits conveniently opened for use on the flat base of the receptacle and can be carried using the handle. The loop portion can be supplied with a suitable means for re-closure as required.

A yet further application of a device according to the invention is as a foldable hat. A suitably sized device having the handle portion adapted to act as a peak and including the longitudinal fold and first transverse fold on the handle and loop portions can be formed as a foldable hat, which can be disposable or for long term use, depending on the materials of construction. The loop portion acts as the brim to the hat, fitting round a wearer's head, and the receptacle forms the head covering. The loop portion (brim) may include at least one thread or wire stitched around the loop portion to provide tear resistance. Advantageously this may be of an elasticated thread, which, even if the brim is torn in use, will allow the hat to fit closely to the wearer's head.

Advantageously the inside edge of the loop portion, adjacent the wearers head in use, is formed with inwardly facing projections or "fingers", preferably continuations of the sheet material, disposed around the loop. The fingers are deformable and so allow a hat to fit to users with different sized heads. They also provide a more comfortable and secure fit to the head. Preferably the fingers are spaced apart as abutting fingers would be liable to catch the wearer's hair between them. The fingers may be provided all around the loop portion or only in selected locations. Preferably the fingers are not provided on the portion of the loop proximal to the peak of the hat. This can give a more comfortable fit to the hat. The portion of the loop proximal to the peak is adjacent or abuts the forehead of a wearer of the hat, in use. The forehead may not have a covering of hair, which acts to cushion the pressure of the fingers elsewhere on the head.

According to a second aspect the present invention provides an article comprising a portion of a self supporting sheet material, said sheet material being divided along its length by a first fold and further divided into a first, handle portion and a second, end portion, by an angle fold, transverse to the first fold; said angle fold comprising two fold portions each running diagonally, from opposed edges, across the sheet material in a direction towards the end portion and meeting to form an angle with its apex on the first fold; whereby in use, when the portion of sheet material is partially folded about the angle fold a user folding or unfolding the handle end about the first fold causes the end portion to move respectively towards or away from the handle portion.

Collector devices according to the first aspect of the invention and having a transverse angle fold constitute an article according to the second aspect of the invention. The folding and unfolding for deployment of the collector device is made easier and more rapid by the action between the handle portion and the receptacle loop portion (i.e. the end portion) caused by folding or unfolding the longitudinal fold at the handle portion. Other articles of the second aspect of the invention having the fold arrangement can include simple children's toys. A small folding action ('squeeze') or unfolding of a handle can result in a relatively large backwards or forwards movement of the corresponding end portion, as described hereafter with reference to a specific embodiment, giving a lively action to the toy, especially where the sheet material has folds with a resilience that urges the toy towards the unfolded condition. The action of the toy can be further improved by the provision of a resilient biasing member such as a spring or a rubber band fitted to return the handle towards a selected position after squeezing. The end portion may be formed in many ways to suit the requirements of the toy. It may simply comprise a sheet of material, printed with a picture, which moves in response to squeezing the handle portion. Alternatively the end portion may be a loop or any other shape to give the desired form to the toy. Advantageously the toy may be provided with an end portion formed for the attachment of different images or three-dimensional shapes. For example, the end portion may comprise a frame or holder for the replaceable attachment of pictures or three-dimensional shapes. A child playing with the toy may then change the appearance or the shape of the animated part of the toy as desired during play.

According to a third aspect the present invention provides a hand held display device comprising: an elongate handle portion having at one end a display portion attached thereto; wherein said handle and display portions are of a self supporting sheet material having a longitudinal fold running along the length of the handle portion and continuing across the display portion; whereby in use the display device may be deployed with said handle and display portions held partially folded along said longitudinal fold to provide increased rigidity in comparison with a device where the handle and display portions are held planar.

The longitudinal fold of the display device confers the advantage of increased rigidity, even when the sheet material is only just self supporting, as described before in relation to the collector devices of the first aspect of the invention. The display device can conveniently be manufactured of similar materials and in the same ways as described for the collector devices.

As with the collector devices according to the first aspect of the invention the display device may be held in the desired state, partially folded (along the longitudinal fold), by hand or by any of the other means, such as a strap or tie as described before.

The display portion may be of any desired shape, with information, such as, written, graphical or pictorial information, displayed on one or both sides of the sheet. Advantageously the display portion is of a generally square or rhomboid shaped portion of sheet material with an apex adjacent the handle portion.

Alternatively or additionally the display portion may have a display sheet, attached to the display portion, which carries the information. The display sheet may be folded, when not in use, in any desired fashion to make the device more compact. Where a display sheet carries the information the display portion may take the form of a loop with at least a portion of the display sheet disposed across the loop.

Preferably the display device further comprises a first transverse fold, across the width of the device at or near the junction of the handle portion and the display portion. The provision of the first transverse fold allows the device to be stored in a more compact form when not in use. More preferably the display device comprises a first transverse fold of the same angle fold form as described before for the collector devices of the first aspect of the invention. Display devices having an angle fold of this form also constitute a device of the second aspect of the invention.

It will also be appreciated that a display device where the handle portion is not elongate, but takes some other form, for example a square of the sheet material, will constitute a device of the second aspect of the invention.

For some applications, for example a map for use when walking, an elongate handle portion is preferred as it provides a good grip. In other circumstances the display device may in use be stood up on a surface, with the display portion supported upright by the handle portion, as described hereafter with reference to a specific example (a menu on a table, FIG. 11b). In such cases the handle portion may be chosen to be elongate or not elongate.

As with the collector devices a perforation may be provided at or near the apex of the angle fold, to reduce the likelihood of tearing during folding and unfolding operations.

Preferably the display device is provided with a second transverse fold, running across the width of the display portion at right angles to the longitudinal fold. More preferably the second transverse fold is at right angles to the longitudinal fold and divides the display portion approximately in half. This allows the folding of the display device in a particularly effective and compact fashion as described before for the collector devices of the first aspect of the invention.

The display devices of the invention, especially those with the first and second transverse folds, or other folding arrangements, provide a convenient often pocketable means of holding information. Once deployed the devices can be conveniently held in the hand, even in windy conditions, and the information on the display portion consulted. Alternatively the display device when comprising the angle fold of the second aspect of the invention may be deployed stood up on a surface, with the display portion supported upright by the handle portion. Even when made of a thin relatively flexible sheet material, such as an 80 gsm$^{-2}$ paper, devices of the invention can have sufficient strength and resilience to be free standing for display purposes, when folded appropriately as described hereafter with reference to the example of FIG. 11.

The information carried may be, for example, restaurant menus, charts, plans or maps. The display devices can also find particular use as greeting cards and in advertising promotional items such as mailers. The display portion or attached display sheet, if employed, can be any desired shape. A greetings card or advertising display can be made in an appropriate form for the occasion as well as being provided with appropriate text and pictures. For example a birthday card may have a display portion in the form (two dimensional) of a champagne bottle, carrying appropriate greetings. The display portion may be asymmetric in shape or have holes to provide the desired attractive and/or informative appearance.

The card can be provided neatly folded (the Z shape as discussed previously is preferred) in an envelope for delivery. Opening the card may be assisted by the provision of one or more tabs attached to the device in appropriate locations. On opening the card can be stood up on a table for general display of the message or other information.

Further preferred features and advantages of the present invention will appear from the following detailed description given by way of example of some preferred embodiments illustrated with reference to the accompanying drawings in which:

FIGS. 4 (a,b) show a second embodiment of a device of the invention and its sealing after use;

FIG. 5 shows a handle portion of a collector device of the invention;

FIGS. 6(a,b) show an alternative handle arrangement;

Figure 1A:
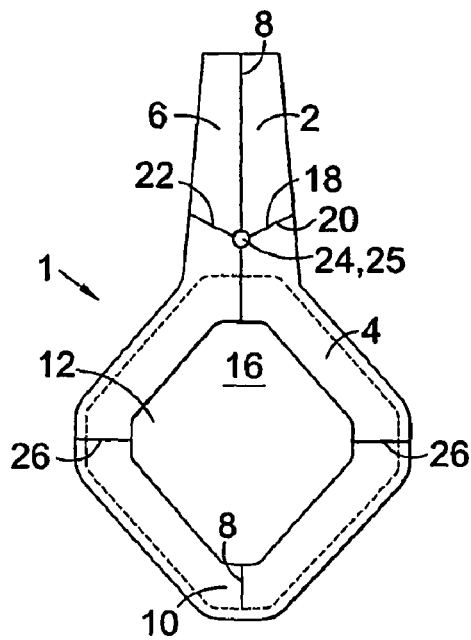
FIGS. 1 (a,b) show plan and perspective views of a collector device of the invention.

FIG. 1a shows in plan view a collector device 1 of the invention. The device has a handle portion 2 and a loop portion 4 made of a single sheet 6 of a thin card. A longitudinal fold 8 is formed by creasing to run centrally along the length of the handle portion 2 and continues across the loop portion 4 including the part 10 of the loop portion 4 most distal from the handle portion 2. The loop portion 4 has a generally square form and has a receptacle 12, (see FIG. 1b), a polyethylene bag, attached by adhesive bonding 14. The receptacle 12 presents an upwardly facing deposition surface 16 for receiving a deposit of, for examples faeces or urine from a dog.

The collector device 1 also includes first transverse fold 18 at the junction between the handle portion 2 and the loop portion 4. The first transverse fold 18 has two portions 20, 22 which form an 'angle fold' arrangement with its apex 24 on the longitudinal fold 8. A small hole 25 is made in the sheet material at the apex 24 of the angle fold. A second transverse fold 26 is provided on the loop portion 4, at right angles to the longitudinal fold 8, dividing the loop 4 into substantially equal portions.

Figure 1B:
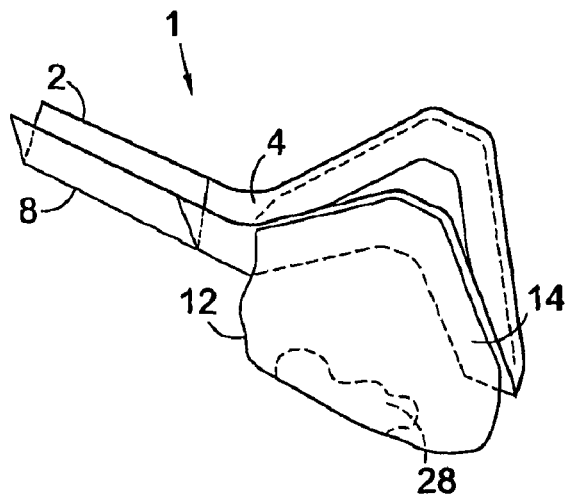

FIG. 1b shows in perspective the collector device 1 of FIG. 1a deployed for use. The device 1 is partially folded about the longitudinal fold 8 and can easily be held in this position by the hand of a person operating the device, holding as the handle portion 2. The 'V' shape form assumed by the handle portion 2 and the receptacle loop portion 4 increases the stiffness and the load bearing capacity of the device 1. A load 28 placed in the receptacle 12 which, if the sheet 6 was deployed in planar fashion, would cause the card of the sheet 6 to bend and collapse, at least at the first transverse fold 18, can be supported with the device deployed as shown due to the strength of the V shape provided by partial folding.

FIGS. 2(a, b, c) illustrate the sequence of the preferred method and arrangement of folding (for storage prior to deployment) of a collector device 1 of the form shown in FIG. 1. The receptacle 12 is not shown in these views for clarity; it is readily compacted around the folded sections of the sheet 6. In FIG. 2a the start of the folding process is illustrated, with the device 1 not folded along the longitudinal fold 8. The handle portion 2 is folded upwards at the first transverse fold 18 and the loop portion 4 is folded in half at the second transverse fold 26 with the fold being moved downwards as shown so that a zigzag or 'Z' folding arrangement is started. In FIG. 2b the Z folding has advanced further and the device 1 is also beginning to be folded along the longitudinal fold 8. The 'angle fold' of the first transverse fold 18 assists in this action. The handle portion 2 is folded along the longitudinal fold 8 in the opposite direction to that when the device is deployed as in FIG. 1b. This causes the handle portion 2 and the loop portion 4 to move towards each other by the force exerted at the first transverse fold 18. In FIG. 2c folding is completed along both transverse folds 18, 26 and the longitudinal fold 8 to form a compact, substantially flat, folded shape with the handle portion 2 nested inside the loop portion 4. It will be understood that the same folding sequence can equally be carried out by folding the handle portion 2, along the longitudinal fold 8, in the same direction to that shown in FIG. 1b and reversing the direction of folding of the first and second transverse folds 18,16, as shown in FIGS. 2d and 2e.

Figure 2A:
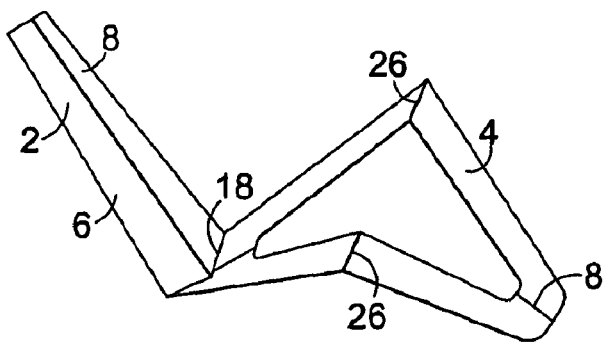
FIGS. 2 (a to f) show folding operations of the device of FIG. 1.
Figure 2B:
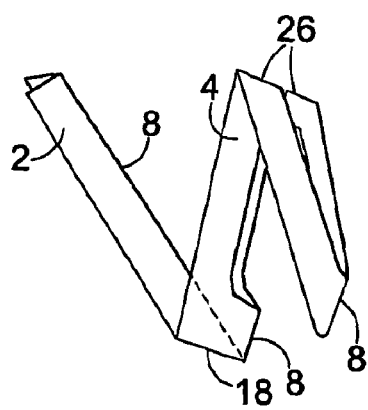
Figure 2C:
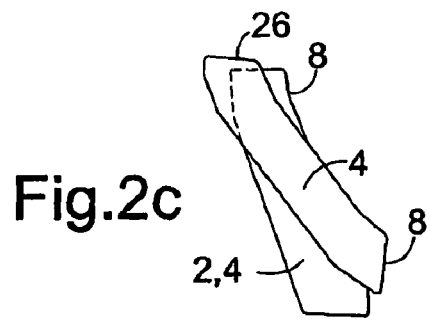
Figure 2D:
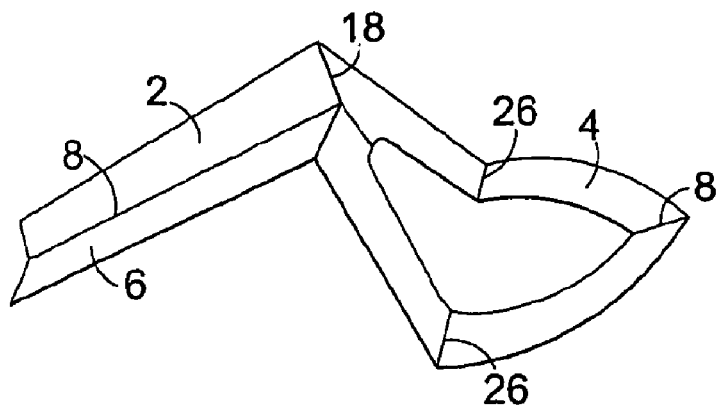
Figure 2E:
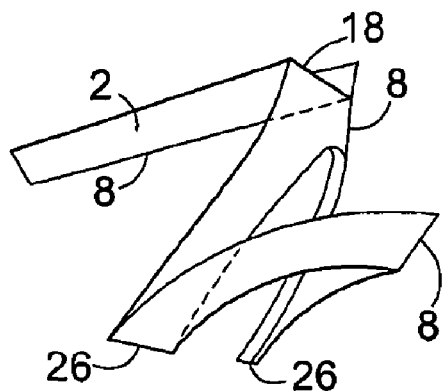
Figure 2F:
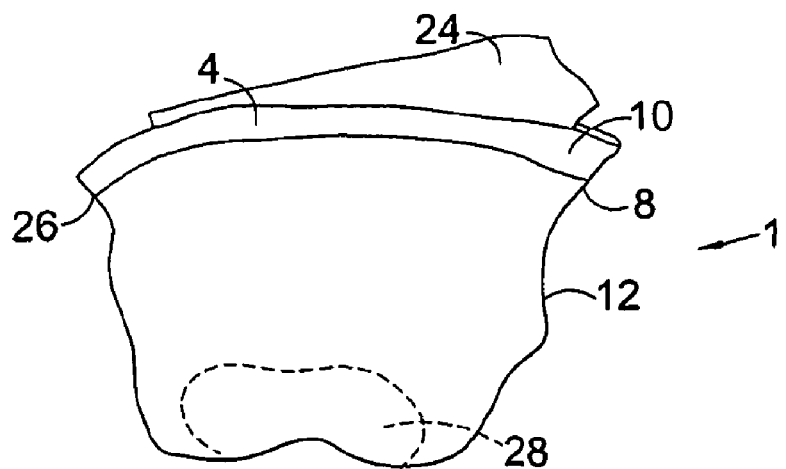

FIG. 2f shows the device 1 folded following the method of FIGS. 2d and 2e but following use and containing a load 28 in the receptacle 12. In this fashion the loaded device 1 may carried, with the receptacle 12 effectively closed, to an appropriate disposal point.

Deploying the device 1 follows the opposite sequence to that shown in FIGS. 2(*a*,*b*,*c*). As a user unfolds the handle portion 2 about the longitudinal fold 8 towards the planar (FIG. 2b), forces act at the angle fold 18 to push the loop portion 4 away from the handle portion 2, resulting in the position shown in FIG. 2a. Continuing to fold the handle portion 2 about the longitudinal fold 8 from the position shown in FIG. 2a to the (deployed) angle of FIG. 1b urges the loop portion 4 towards its deployed position as shown in the figure.

Figure 3A:
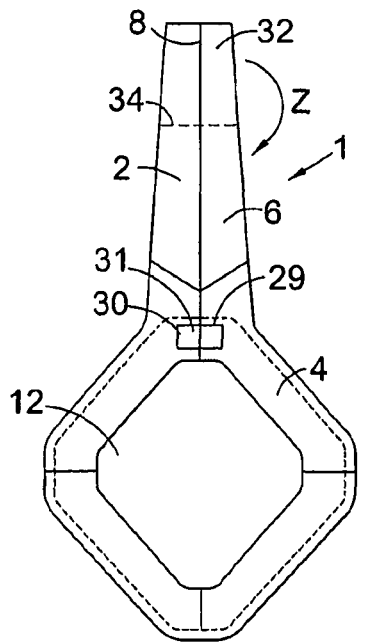
FIGS. 3 (a,b,c,d,e) show respectively, plan and elevation views of use of a receptacle closure means with a device of the invention, folding of the device before use and deployment of the device immediately before use.

FIG. 3a shows in plan view a collector device 1 of generally similar form to that of FIG. 1. The device 1 is provided with an adhesive patch 29 of a pressure sensitive adhesive which is covered by a release paper 30 prior to use. The adhesive patch 29 is a receptacle closure means 31 for the device. A handle extension portion 32, which includes a continuation of the longitudinal fold 8, is attached at a (perforated) third transverse fold 34. The handle extension portion 32 increases the length of the handle of the device to allow more remote manipulation of the loop portion 4 and its attached receptacle. By virtue of the longitudinal fold 8 the handle extension portion 32, can be held in the preferred partially folded V formation together with the handle portion 2 and the loop portion 4. The perforated third transverse fold 34 allows the handle extension portion 32 to be torn off if desired and used to assist in collecting misplaced faecal deposits or other material.

The device of FIG. 3a can be folded prior to use in similar fashion to that of the device shown in FIG. 2a, with the handle extension portion 32 folded forwards onto the top surface of the handle portion 2 as indicated by the arrow Z in FIG. 3a. Alternatively the handle extension portion may be oppositely folded, onto the lower surface of the handle portion 2 in an (inverted) 'w' folding operation, similar to that of the Z folding of FIG. 2 and as illustrated in FIG. 3c.

Figure 3B:
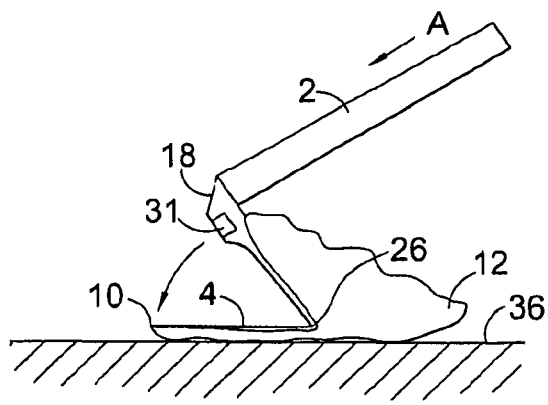
Figure 3C:
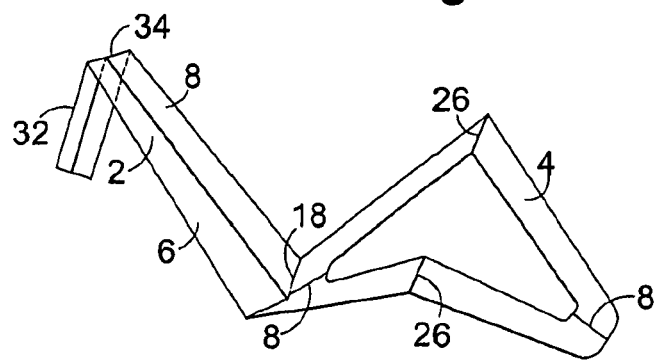

FIG. 3b illustrates use of the receptacle closure means 31. After use, when the receptacle 12 is loaded, the device can be folded at the second transverse fold 26 and at the first transverse fold by placing the loop 4 on the ground 36 and pushing on the handle portion 4 in the direction of the arrow A. The adhesive patch 29 will hold the receptacle loop 4 folded closed when it is pressed onto the end 10 of the receptacle loop portion most distal from the handle portion 4.

Figure 3D:
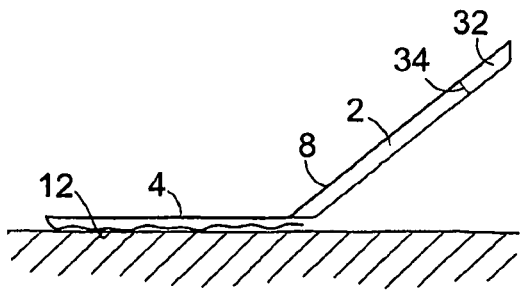

FIG. 3d illustrates deployment of the device 1 before use. The receptacle 12 and loop portion 4 are substantially flat on the ground and the handle portion 2 is raised and held in a slight inverted V fold about the longitudinal fold 8. Thus the device can be positioned accurately for use under even a small dog.

Figure 3E:
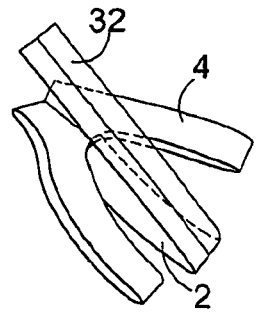

FIG. 3e shows an alternative folding arrangement for the device 1 where the handle portion 2 and the handle extension portion 32 are folded around the loop portion 4.

FIG. 4a shows in plan view an alternative embodiment of a collector device 1 of the invention. The device 1 has a similar handle portion 2 to that of FIG. 1, but the loop portion 4 has a triangular form. A layer of adhesive 38 is provided as receptacle closure means 31 all around the loop portion 4. The adhesive layer 38 is covered by a release paper loop 40, which has a tab 42 to facilitate removal.

The embodiment shown does not include a second transverse fold, running across the loop portion 4, but it will be understood that such a fold could be incorporated in a similar device, to aid compact folding, if desired.

In use after the device 1 is loaded, the release paper loop 40 is removed by pulling on the tab 42 to expose the adhesive layer 38. The loaded device can then be folded in half along the longitudinal fold 8, to provide sealing contact all round the receptacle loop 4, closing the receptacle, as shown in FIG. 4b.

FIG. 5 shows in cross section a handle portion 2 of a device 1 of the invention generally similar to that of FIG. 1, in the deployed state. In this example ties 44, 45 are bonded to each edge of the handle portion 2 to hold the desired angle at the longitudinal fold 8, which in this case is about 60 degrees.

FIG. 6a shows in a handle portion 2 of a device 1 of the invention generally similar to that of FIG. 1, in a planar state. In this example a sleeve 46 of a polyethylene sheet material is provided across the surface of the handle portion 2. In FIG. 6b the handle portion 2 is shown in the partially folded (deployed) state. The handle portion is held with the desired degree of longitudinal folding by insertion of a rigid member 48 (for example a pen torch) between the sleeve 46 and the handle portion 2.

Figure 7A:
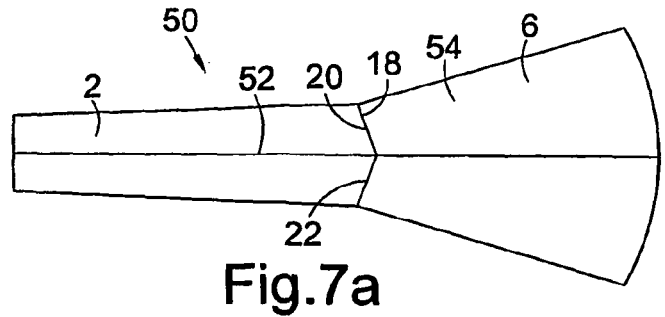
FIGS. 7 (a,b,c) show an article according to the second aspect of the invention and its operation.

FIG. 7a shows in plan, unfolded, view an article 50 according to the second aspect of the invention. The article 50 is a child's toy consisting of a single sheet 6 of thin card, which has a first, in this example longitudinal, fold 52 dividing the sheet in two. The sheet 6 is further divided into a handle portion 2 and an end portion 54 by a transverse angle fold 18, of two portions 20,22, similar to that of the collector devices of the previous figures. The end portion is provided with an image 56 of a face on one side (see FIG. 7c).

Figure 7B:
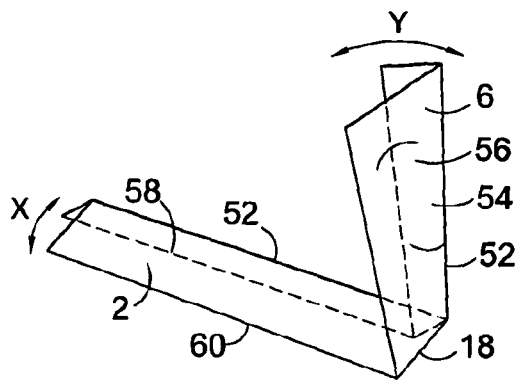

FIG. 7b shows the article 50 folded and in use. The article is folded at the angle fold 18 so that the end portion 6 is upstanding. Folding and unfolding the handle portion 2 along the first fold 52 as indicated by the arrow X results in substantial backwards and forwards movement of the end portion 54, as indicated by the arrow Y, giving lively movement to the image 56 on the end portion 54. A simple squeezing action on the opposed edges 58,60 of the handle portion 2 causes folding, releasing the squeezing force applied allows unfolding, aided by the weight of the end portion 54, falling forwards and also by the resilience of the material at the folds which tends to give a spring like action to the device.

Figure 7C:
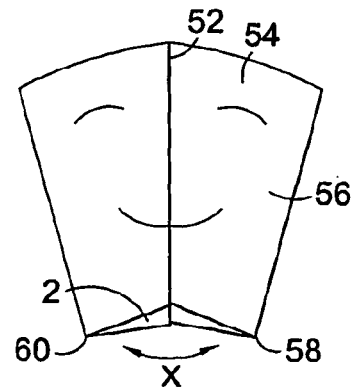

FIG. 7c shows the article 50 deployed as in FIG. 7b from the front, with the image presented for viewing.

Figure 8B:
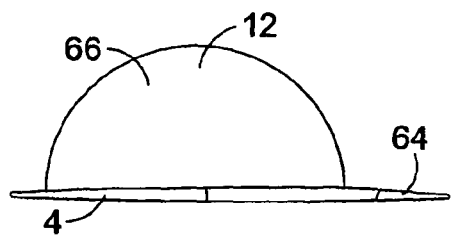
FIGS. 8 (a-c) show a hat of the invention.
Figure 8A:
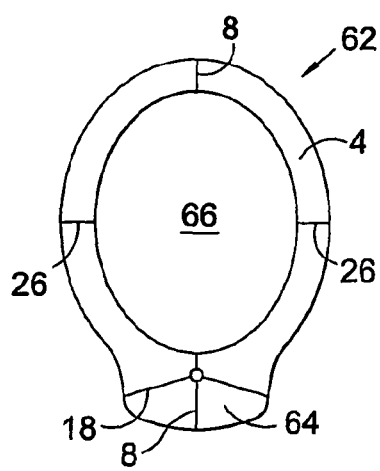
Figure 8C:
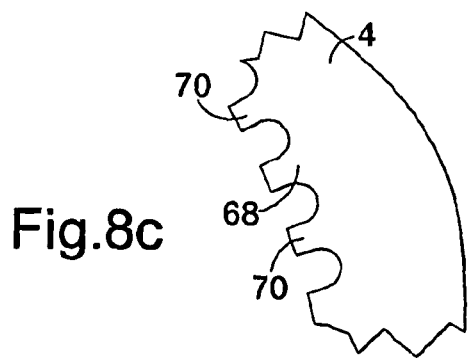

FIG. 8a shows in plan view a disposable hat 62, which conforms generally to the construction of the device 1 shown in FIG. 1. The hat 62 features the longitudinal fold 8, first and second transverse folds and loop portion 4 (as hat brim) of the device of FIG. 1. The handle portion 2 is formed as a hat peak 64. As shown in the side view of FIG. 8b the receptacle 12, a bag of a water resistant biodegradable, flexible material, is formed as a head-covering portion 66 of the hat 62. The sheet material of the hat peak and brim are formed of a water resistant and biodegradable sheet material. In FIG. 8c a detail from the brim (loop portion 4) of the hat 62 is shown. The brim has on its inside edge 68, spaced apart fingers 70 of the sheet material of the brim which allow a comfortable and secure fitting to different sizes of heads. By virtue of folding in the same manner as shown in FIG. 2 the hat can be supplied in a compact pocketable form that is easily unfolded for use.

Figure 9A:
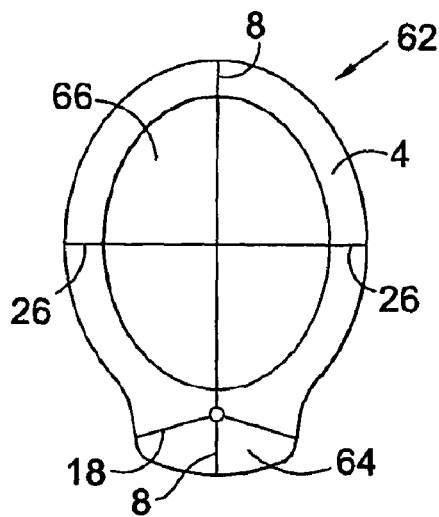
FIGS. 9(a,b) show another embodiment of a hat Of the invention.
Figure 9B:
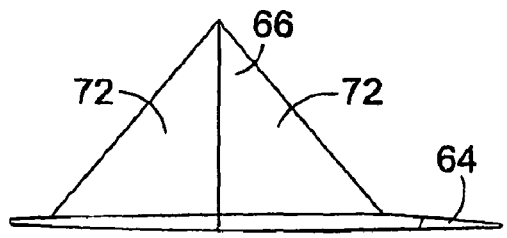

An alternative embodiment of a hat 62 is shown, in plan and side elevation views, in FIGS. 9a and 9b. The hat 62 has generally the same form as that shown in FIG. 8 but features a pyramidal head covering 66. The head covering presents four substantially planar faces 72 which can be used to display advertising slogans club logos or the like.

FIG. 10 (a to d) shows another embodiment of a hat 62. The hat is shown in side elevation in FIG. 10a. It has a peak and loop portion (brim) of generally the same form as that shown in FIG. 8. The head covering 66 takes the form of a pleated paper sheeting 74 which overlays the loop portion. This hat may be conveniently folded by first folding the loop portion 4 (brim) about the second transverse fold 26 in the direction shown by the arrow A in FIG. 10a. This results in the situation shown in the plan view of FIG. 10b where the head covering 66 is "concertinaed" inside the two halves of the loop portion (brim) 4. The folding of the hat is completed by simultaneously folding the peak 64 upwards, about the first transverse fold 18, towards the loop portion 4 (arrow B in FIG. 10a) and by folding the whole hat 62 about the longitudinal fold 8 so that the peak 64 nests inside the loop portion 4. The resulting compact, essentially flat, folded condition is shown in FIG. 10c.

This convenient method of folding can be used as an alternative to the Z folding shown in FIG. 2, for devices of the invention other than hats, provided that when folded about the second transverse fold 26 the loop portion 4 does not lie over the handle or peak portion of the device.

Figure 10A:
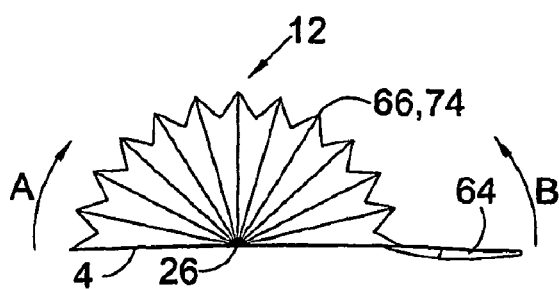
FIGS. 10 (a-d) show a yet further embodiment of a hat of the invention.
Figure 10B:
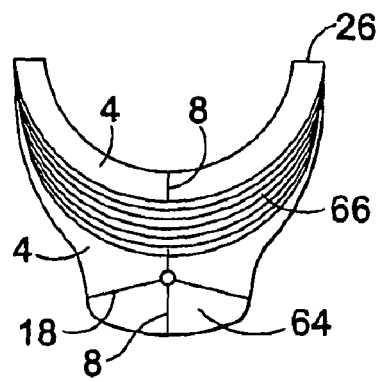
Figure 10C:
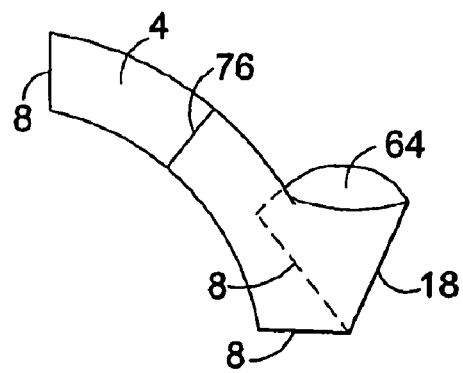
Figure 10D:
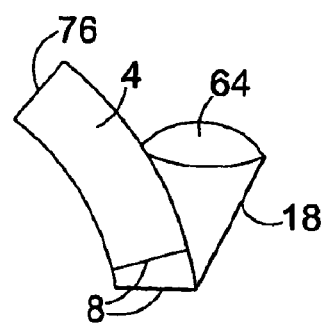

In this example, further folding about an additional transverse fold 76 on the loop portion 4 is carried out to achieve the particularly compact form shown in FIG. 10d.

Figure 11A:
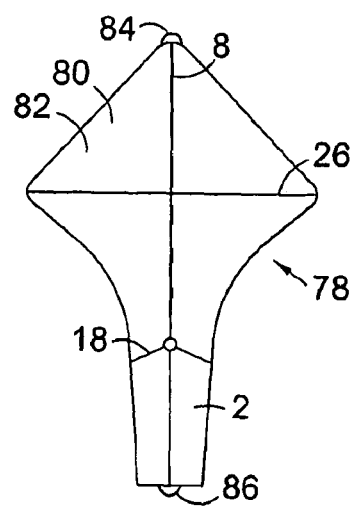
FIGS. 11(a,b,c,d) show a display device according to the third aspect of the invention.
Figure 11B:
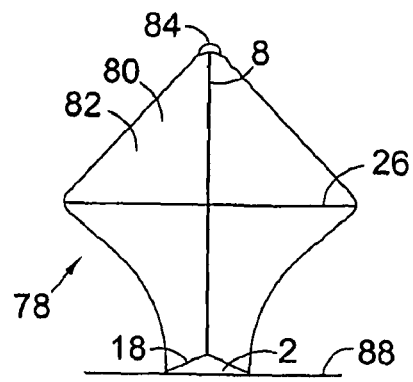

FIG. 11a shows in plan view a display device 78 according to the third aspect of the invention. The device 78 has an elongate handle portion 2 and a display portion 80 formed from a single piece of thin card sheet. The device 78 has a longitudinal fold 8, a first transverse (angle) fold 18 between the handle portion 2 and the display portion 80 and a second transverse fold 26 which divides the display portion 80. Information, for example a menu (not shown for clarity), is displayed on the surface 82 of the display portion 80. The display device of this form can be readily folded into a compact form, about the longitudinal and transverse folds, in the same manner as illustrated in FIG. 2, for a collector device, or as illustrated in FIG. 10 for a hat. It can then be rapidly unfolded for use when required. To aid deployment from the completely folded state two tabs 84,86 are provided at each end of the device, which can be used to "pull out" the device from the completely folded state. FIG. 11b shows in front elevation the same display device 78 as that of FIG. 11b, with the first transverse fold 18 folded back so as to enable the device to sit on a surface 88, such as a table, with the display portion 80 supported upright by the handle portion 2 to conveniently display the information. In this position the display portion 80 is folded slightly backwards as viewed, (along fold 8) and held under slight tension by the folding of the transverse (angle) fold 18. The combination of the transverse fold 18 and at least the lower part 8b of the longitudinal fold 8 stiffens the display portion 80 and strongly biases it to the desired position.

The transverse fold 26 also has an effect on the stiffness as discussed below.

Figure 11C:
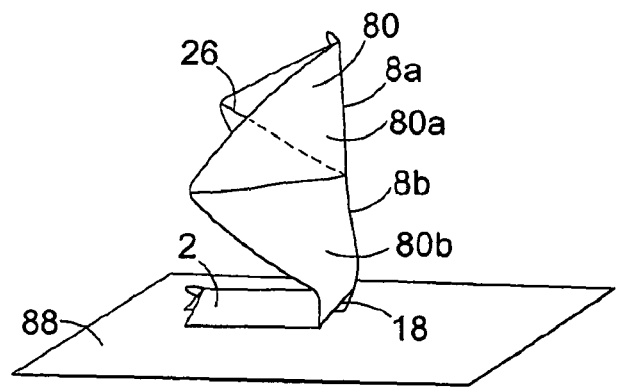

This can be seen more readily in the perspective view of FIG. 11c. Both the upper 8a and lower 8b parts of longitudinal fold 8 on the display portion 80 are folded slightly backwards towards the handle portion 2. This arrangement has the effect of increasing the self-supporting ability of the display portion 80.

Figure 11D:
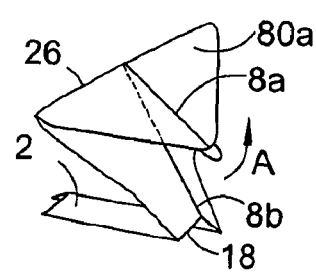

It will be appreciated that the upper part 8a of longitudinal fold 8 may be folded in the opposite sense to that of the lower part 8b when the display device is folded into a compact form along second transverse fold 26 (see the partially folded view of FIG. 11d). On unfolding the device to its standing position the lower part 8b of the longitudinal fold 8 is held slightly folded (and the lower part of the display portion 80b held under slight tension) by the action of the angle fold 18. The upper part 8a of the longitudinal fold 8 is moved by a user of the device into the position of FIG. 11c by fully opening second transverse fold 26 in the direction of the arrow A of FIG. 11d.

This movement is assisted by the tension placed on the lower part of the display portion 80b. The upper part of the display portion 80a snaps, is "popped", into position by finger pressure at or near the intersection of fold 8 and transverse fold 26. The sense of the upper part 8a of the longitudinal fold 8 is changed to the same as that of the lower part 8b, at least in the vicinity of the intersection of fold 8 and transverse fold 26.

When in the standing position, shown in FIG. 11c, additional stiffness is provided to the opened out display portion 80 by the action of the longitudinal fold 8 and transverse fold 26. Folds in typical lightweight material, such as the thin card employed in the display device 78 of FIG. 11, are usually made simply by folding the sheet along a desired fold line and applying pressure to form a crease, a deformation of the sheet material. The sheet is thereafter biased to fold along that fold line in the direction of original folding i.e. if the sheet is opened out it tends to fold back in the direction the fold was first made. In a device such as that of FIG. 11, transverse fold 26 and the upper part 8a of longitudinal fold 8 bias the display portion 80 to fold in a direction opposite to that of arrow A shown in FIG. 11d. Conflict between the biasing of these folds 8a, 26 and the (opposite) biasing of the lower part 8b of longitudinal fold 8 when in the standing position of FIG. 11c introduces a tension to the sheet forming the display portion 80, providing added stiffness.

As a consequence of the folding arrangement and because of the biasing effect of creased folds, devices such as shown in FIG. 11 can have sufficient strength and resilience to be free standing even when made from thin relatively flexible sheet material, for example a paper of 80 gm$^{-2}$.

Figure 12A:
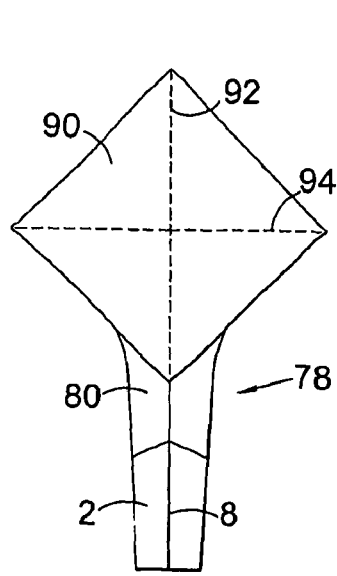
FIGS. 12 (a,b) show a further embodiment of a display device according to the third aspect of the invention.
Figure 12B:
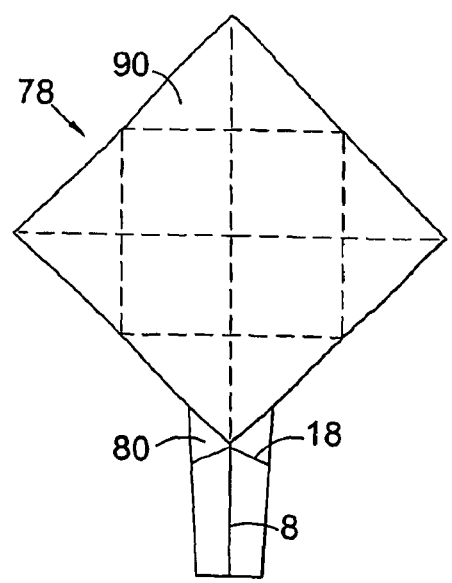

FIG. 12a shows in plan view a display device 78 generally similar to that of FIG. 11a but in this case a folded display sheet 90 is attached, by glueing onto the display portion 80. The display sheet 90 has folds 92,94, shown in dashed line, that correspond to the longitudinal and second transverse folds of the display portion 80. FIG. 12b shows the display sheet 90 unfolded to allow viewing of the information, for example a map. The fold lines of the display sheet are again shown in dashed line. The display device 78 can be folded for storage or pocketing in the same ways as the device of FIG. 11 but the display sheet 90 provides a greater area for the display of information for a given size of display portion 80.

The invention claimed is:

1. A collector device comprising:
    an elongate handle portion having at one end a loop portion attached thereto, said loop portion supporting a receptacle which comprises an upwardly facing, in use, deposition surface; wherein said handle and loop portions are of a self supporting sheet material, having a longitudinal fold in the sheet material running along the length of the handle portion and continuing across the whole loop portion; whereby, in use, the device may be deployed with said handle and loop portions both held partially folded along said longitudinal fold in a V or inverted V conformation to provide increased rigidity and increased load bearing capacity, in cantilever, in comparison with a device where the handle and loop portions are held horizontally planar.

2. A collector device according to claim 1 wherein the receptacle is suitable for use in collecting animal or human faeces or urine.

3. A collector device according to claim 1 wherein the longitudinal fold runs along the centre of the elongate handle portion.

4. A collector device according to claim 1 wherein the handle portion and the loop portion attached to it are of one piece in construction.

5. A collector device according to claim 1 wherein the self supporting sheet material is selected from card, corrugated card, plastics, corrugated plastics, and wax coated or plastic coated card or cardboard.

6. A collector device according to claim 1 wherein at least one of the handle portion and the loop portion are made of a self supporting sheet material that has holes distributed across the sheet to reduce its weight and the total quantity of material used in its manufacture.

7. A collector device according to claim 1 wherein the receptacle takes the form of a bag sized and shaped for the chosen application.

8. A collector device according to claim 7 wherein the bag is of a water resistant flexible material.

9. A collector device according to claim 8 wherein the receptacle is a flexible bag of a liquid resistant material and the rim of the bag overlays the upper, in use, surface of the loop portion.

10. A collector device according to claim 7 wherein the receptacle is formed by first bonding a sheet of a liquid resistant plastics material onto the upper, in use, surface of the loop portion and then creating the desired receptacle shape by carrying out a vacuum forming process on the portion of the sheet of plastic lying across the inside of the loop portion.

11. A collector device according to claim 1 wherein the receptacle is sealingly attached all around the loop portion.

12. A collector device according to claim 1 wherein the receptacle is supplied as a replaceable, disposable item which clips onto the loop portion.

13. A collector device according to claim 1 further comprising a strap or tie, fixable transversely across at least one of the handle portion and the loop portion to prevent unfolding about the longitudinal fold.

14. A collector device according to claim 1 further comprising a sleeve portion, or a loop or loops, disposed transversely along the handle portion.

15. A collector device according to claim 1 further comprising a first transverse fold, across the width of the device at or near the junction between the handle portion and the loop portion.

16. A collector device according to claim 15 wherein the first transverse fold is an angle fold comprising two fold portions each running diagonally across the sheet from opposed edges of the handle portion in a direction towards the loop portion and meeting to form an angle, with its apex on the longitudinal fold.

17. A collector device according to claim 16 wherein the sheet material has a perforation at the apex of the angle fold.

18. A collector device according to claim 15 further comprising a second transverse fold running across the width of the loop portion at right angles to the longitudinal fold.

19. A collector device according to claim 18 wherein the second transverse fold is at right angles to the longitudinal fold and divides the loop portion approximately in half.

20. A collector device according to claim 1 wherein the handle portion has a length corresponding to approximately half the diameter of the loop portion.

21. A collector device according to claim 1 wherein the handle portion is provided with a handle extension portion, distal from the loop portion and including a continuation of the longitudinal fold of the handle portion; and connecting, at a third transverse fold, to the end of the handle portion.

22. A collector device according to claim 21 wherein the third transverse fold comprises multiple perforations along the fold line, to allow the handle extension portion to be easily torn off.

23. A collector device according to claim 1 wherein the loop portion has the form of a rhombus or a square with an apex adjacent the handle portion.

24. A collector device according to claim 1 further comprising a releasable closure means when in a folded state before deployment.

25. A collector device according to claim 1 further comprising a receptacle closure means for closing a loaded receptacle following use.

26. A collector device according to claim 1 wherein the receptacle closure means comprises an adhesive surface running around at least one half of the loop portion.

27. A collector device according to claim 1 wherein the receptacle is perforated or in the form of a mesh.

28. A collector device according to claim 1 wherein the receptacle is in the form of a bag with a flat base formed for sitting on a surface.

* * * * *